US011701816B2

(12) United States Patent
Barnes et al.

(10) Patent No.: US 11,701,816 B2
(45) Date of Patent: Jul. 18, 2023

(54) PROCESS FOR REINFORCING CONTINUOUS FIBER ADDITIVELY MANUFACTURED LAMINATES

(71) Applicant: NORTHROP GRUMMAN SYSTEMS CORPORATION, Falls Church, VA (US)

(72) Inventors: Eric G. Barnes, Rancho Palos Verdes, CA (US); Talbot P. Thrasher, Newark, DE (US); Timothy E. Dominick, Elkton, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 148 days.

(21) Appl. No.: 17/122,343

(22) Filed: Dec. 15, 2020

(65) Prior Publication Data

US 2022/0184880 A1  Jun. 16, 2022

(51) Int. Cl.
*B29C 64/118* (2017.01)
*B29C 64/188* (2017.01)
*B33Y 40/20* (2020.01)
*B33Y 10/00* (2015.01)
*B33Y 70/10* (2020.01)
*B29K 101/12* (2006.01)
*B29K 307/04* (2006.01)

(52) U.S. Cl.
CPC .......... *B29C 64/118* (2017.08); *B29C 64/188* (2017.08); *B33Y 40/20* (2020.01); *B29K 2101/12* (2013.01); *B29K 2307/04* (2013.01); *B33Y 10/00* (2014.12); *B33Y 70/10* (2020.01)

(58) Field of Classification Search
None
See application file for complete search history.

(56) References Cited

U.S. PATENT DOCUMENTS

| 5,863,635 A | 1/1999 | Childress |
| 9,782,928 B2 | 10/2017 | Barnes et al. |
| 2009/0174709 A1* | 7/2009 | Kozlak ................ B33Y 50/02 345/420 |

(Continued)

FOREIGN PATENT DOCUMENTS

| EP | 2581201 A1 | 4/2013 |
| EP | 2889132 A1 | 7/2015 |

(Continued)

*Primary Examiner* — Christopher T Schatz
(74) *Attorney, Agent, or Firm* — John A. Miller; Shumaker, Loop & Kendrick LLP

(57) ABSTRACT

A method for fabricating a composite part using a 3D printing machine. The method includes forming the part by depositing a plurality of part layers in a consecutive manner on top of each other where each layer is deposited by laying down rows of filaments made of a thermoplastic composite material. Reinforcing Z-pins are then inserted through the part layers to provide reinforcement of the part in the Z-direction. A plurality of additional part layers are deposited in a consecutive manner on top of each other on the part layers including the reinforcing Z-pins where each additional part layer is also deposited by laying down rows of filaments made of a thermoplastic composite material. Reinforcing Z-pins are also inserted through the additional part layers to provide reinforcement of the part in the Z-direction.

19 Claims, 3 Drawing Sheets

(56) References Cited

U.S. PATENT DOCUMENTS

2017/0057155 A1\* 3/2017 Barnes .................. B29C 65/08
2017/0173868 A1\* 6/2017 Mark ................... B29C 64/393
2018/0036946 A1\* 2/2018 Barton ................. B29C 64/118
2019/0091927 A1\* 3/2019 Kune .................. B29C 64/106
2020/0324459 A1 10/2020 Barnes et al.

FOREIGN PATENT DOCUMENTS

EP         3556557  A1   10/2019
WO       199325379  A1   12/1993
WO         9723343  A1    7/1997

\* cited by examiner

PROCESS FOR REINFORCING CONTINUOUS FIBER ADDITIVELY MANUFACTURED LAMINATES

BACKGROUND

Field

This disclosure relates generally to a method for additively manufacturing a thermoplastic composite structure and, more particularly, to a method for additively manufacturing a thermoplastic composite structure including providing reinforcing Z-pins through layers of the structure.

Discussion

Many structural parts and components on aircraft, satellites, spacecraft and other structures need to be light weight and strong in order to satisfy their intended use. In order to meet these requirements, composite structures that include a plurality of laminate layers, such as fiber glass layers, fiber reinforced plastic layers, fiber carbon layers, etc. are often used. For example, some aircraft skin structures include thirty or so laminate layers each having a thickness of about 0.005-0.030 inches. Typically, these composite layers are formed by laying down an interwoven pattern of fibers, such as carbon fibers, that are immersed in a liquid resin, where the resin is cured by heating, which causes it to harden. The several layers are bonded or secured together by a suitable bonding technique, such as co-curing, adhesive bonding, etc.

One known technique for fabricating some of these parts using carbon fiber composite technologies includes laying down many of the carbon fiber ply layers on a tool, where each ply or sheet of the carbon fiber ply layers includes carbon fibers that have been impregnated with a resin, and where the fibers are woven into a fabric or tape. The carbon fiber ply layers are laid on the tool in a continuous stacked manner, where every group of a predetermined number of the ply layers is subjected to a vacuum and heating step to compress the ply layers together and remove air, which otherwise could result in loss of part integrity. Once all of the ply layers have been built up, a vacuum film or bag is placed over the assembled ply layers and sealed to the tool, where the bag is evacuated to a certain vacuum pressure. The tool and sealed part are then placed in an autoclave or heating oven to cure the resin and form the hardened part.

The orientation of the fibers in the laminate layers of these types of composite structures typically has high strength in the X and Y direction along the length of the fibers, but has a relatively low strength in the Z-direction across the fibers. Therefore, it is known in the art to provide mechanical fastening devices that are inserted across the layers to provide increased strength in the Z-direction. One well known technique is referred to as Z-pinning that employs Z-pins inserted into and across composite laminate layers in a Z-direction to improve resistance to delamination, increase out of plane shear, and increase damage tolerance by providing reinforcement in the Z-direction of the structure and not relying simply on adhesive bonding.

A typical Z-pin will be quite small in diameter, such as 0.010-0.020", where a large number of such Z-pins, for example, 60-600, may be inserted cross-wise into the laminate structure per square inch. In one insertion technique, the Z-pins are partially inserted into a top surface of one of the laminate layers while the laminate layers are in a partially cured or pre-preg state, where the resin is still soft and pliable. An ultrasonic tool is positioned against a group of the Z-pins where the ultrasonic energy creates some level of heating that further softens the resin and allows the Z-pins to be inserted through the laminate layers without interfering with the fibers.

A traditional Z-pin has a cylindrical shape. However, more modern Z-pins come in variety of shapes and sizes. U.S. Pat. No. 6,514,593 issued to Jones et al., titled Mechanically Locking Z-Pins, assigned to the assignee of this application and herein incorporated by reference, discusses disadvantages of the traditional Z-pin and proposes shaped Z-pins having increased Z-pinning in the Z-direction. Shaped Z-pins typically provide superior performance to traditional cylindrical Z-pins because they reduce pullout from the composite matrix by increasing surface area for adhesive bonding, mechanically locking into the matrix, and locking into the fiber reinforcement. However, because of the shape of these types of Z-pins, they are more difficult to insert into the laminate structure using an ultrasonic tool while the laminate structure is in the pre-preg state because the shape of the Z-pin alters the position of the fibers in the composite layers as they are being inserted. Often, this type of damage to the fibers during insertion of the shaped Z-pins affects the structural integrity of the layer.

Traditional complex composite fabrication methods, such as autoclave cured hand lay-up, advanced fiber placement, tape placement, etc., are labor intensive, expensive, require a long-lead and expensive tooling and typically require talented fabrication technicians. Therefore, alternate methods have been developed.

Fused filament fabrication (FFF) is an additive manufacturing (AM) process for 3D printing. More specifically, a FFF process provides a feedstock material, such as a filament from a spool or pellets from a hopper, to a heated nozzle, where it is extruded therefrom as a heated molten filament to be deposited as adjacent rows of strips to form a layer, and where the molten filaments immediately begin to harden once they are extruded from the nozzle. Multiple layers are built up in this manner in a certain configuration to produce a desired part. One known example system is the scalable composite robotic additive manufacturing (SCRAM) system available from Electroimpact, which is an industrial true 6-axis continuous fiber-reinforced 3D printer that enables the tool-less rapid fabrication of aerospace-grade integrated composite structures.

Various materials can be used as the feedstock material, such as high performance amorphous or semi-crystalline thermoplastics including polyetheretherketone (PEEK), polyetherketoneketone (PEKK), polyphenylsulfone (PPSF or PPSU), polyetherlimdie (PEI) and polyphenylene (PPS). Other materials that may be suitable for FFF include acrylonitrile butadiene styrene (ABS), polylactic acid (PLA), polycarbonate (PC), polyamide (PA), polystyrene (PS), lignin, rubber, carbon fibers, glass fibers, quartz fibers, Kevlar fibers, ultra-high molecular weight polyethylene (UHMWPE), Dyneema, high impact polystyrene (HIPS), nylon, high density polyethylene (HDPE) eutectic materials, plasticine, room temperature vulcanization (RTV) silicon, etc.

All additive manufactured continuous fiber composite materials fabricated using a placement head and consolidated pre-impregnated filaments or other configured preforms, such as woven strips, braided tubes or the like, will lack interlaminar strength from an absence of interply reinforcement.

U.S. Pat. No. 9,782,928 issued Oct. 10, 2017 to Barnes et al., assigned to the assignee of this application and herein incorporated by reference, describes a system for reinforcing a thermoplastic polymer workpiece using linear Z-pins that has been at least partially formed by an additive manufacturing process. An ultrasonic energy source applies ultrasonic energy to the Z-pins to ultrasonically heat the Z-pins, and thus locally melt the workpiece material of the subject surface and/or the workpiece body to create a melted workpiece material. One end of the Z-pin is penetrated into the melted workpiece material to create an inserted Z-pin length that is maintained in the workpiece by solidified melted workpiece material around the inserted Z-pin length to reinforce the workpiece.

SUMMARY

The following discussion discloses and describes a method for fabricating a composite part using a 3D printing machine. The method includes forming the part by depositing a plurality of part layers in a consecutive manner on top of each other, where each layer is deposited by laying down rows of filaments made of a thermoplastic composite material. Reinforcing Z-pins are then inserted through the part layers to provide reinforcement of the part in the Z-direction. A plurality of additional part layers are deposited in a consecutive manner on top of each other on the part layers including the reinforcing Z-pins, where each additional part layer is also deposited by laying down rows of filaments made of a thermoplastic composite material. Reinforcing Z-pins are also inserted through the additional part layers to provide reinforcement of the part in the Z-direction. The reinforcing Z-pins can be inserted through the layers to provide any suitable reinforcement configuration.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a method for additively manufacturing a thermoplastic composite structure including providing reinforcing Z-pins is merely exemplary in nature, and is in no way intended to limit the invention or its applications or uses.

This disclosure proposes an automated method for reinforcing the interlaminar properties of additive manufactured composite structures by inserting Z-directional rods, tows, pins, filaments or whiskers, referred to herein as Z-pins or rods, into the composite structure employing thermal, mechanical, ultrasonic, chemical (solvent for softening) energy or any combination thereof. The Z-pins are in direct contact with the part surface at the time of insertion of an attachment to the additive manufacturing processing head. The insertion can occur during or after the building process, simultaneously to the additive manufacturing process or in between layer addition. The Z-pin insertions may occur through all or some of the layers and may be staggered by layer or layers and varying of overall area or only certain specific areas of the part. The pin end and at least a portion of the pin body of the Z-pin are penetrated into the hard, melted or softened area of the work piece material and an inserted the majority or all of the Z-pin length. The inserted Z-pin length is maintained in the volume of the material by solidified melted work piece material around the inserted Z-pin length to reinforce the composite structures. This process can be performed either manually or via an automated and/or robotically integrated fabrication system. By inserting Z-pins into the structure during the process of laminating the layers that occurs in the additive manufacturing process, interlaminar re-enforcement will strengthen the structure in the critical through the thickness direction for a structural composite material. It is noted that although thermoplastic composites are the preferred materials for the techniques discussed herein, thermoset composite materials that may have been thermally advanced to behave mechanically and physically in a thermoplastic manner may also be applicable.

Figure 1:
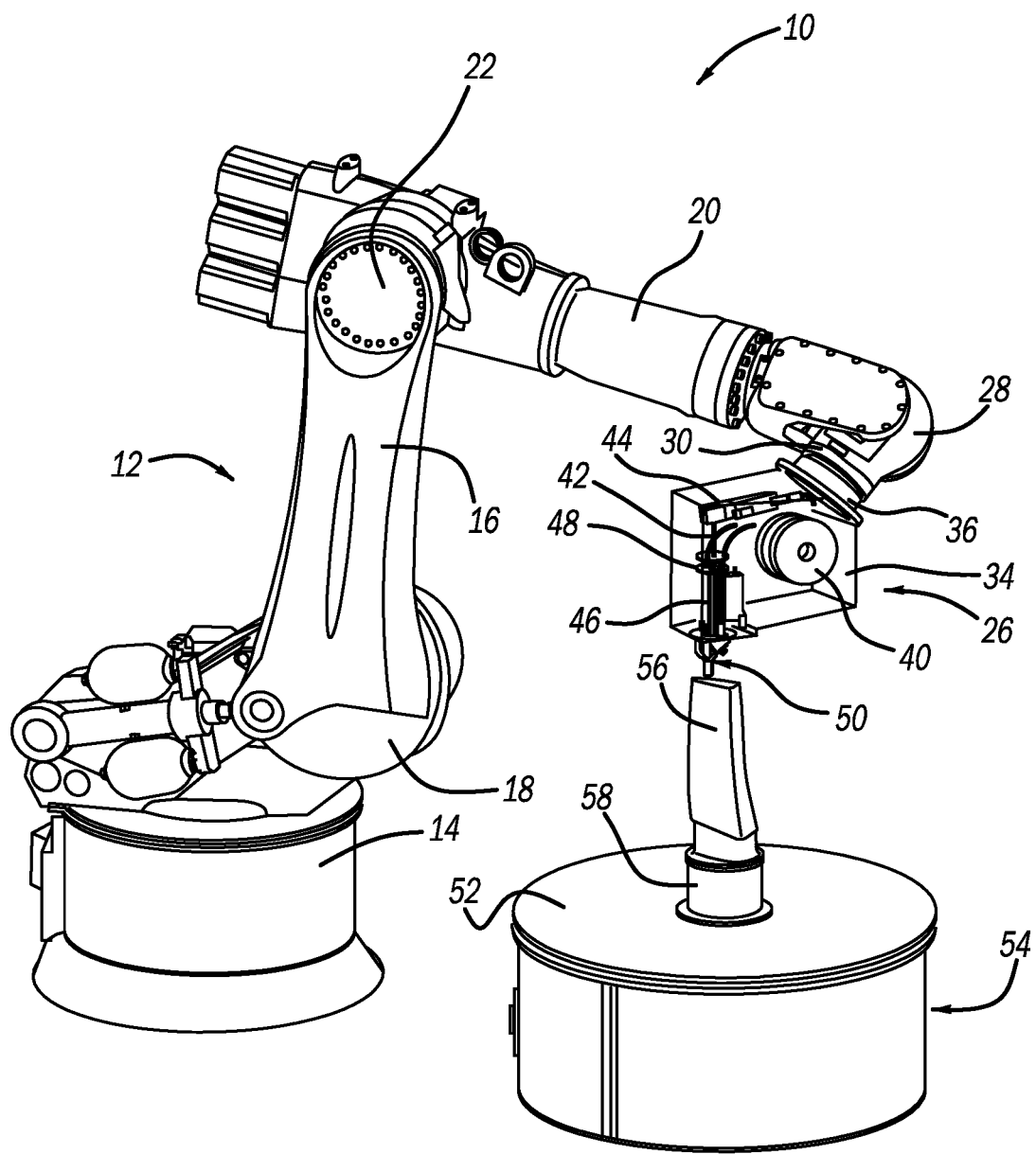
FIG. 1 is an isometric view of a 3D printing machine including a robot and an end-effector positioned relative to a part being fabricated on a build plate.

FIG. 1 is an isometric view of a 3D printing machine 10 that is capable of building a part by an FFF process including providing Z-pin insertions as discussed above, where the machine 10 is intended to be merely representative of any additive manufacturing machine capable of performing the methods and processes discussed herein. The machine 10 includes a robot 12 having a base portion 14, an extension arm 16 coupled to the base portion 14 by a rotary and pivot joint 18, and a working arm 20 coupled to the extension arm 16 opposite to the base portion 14 by an elbow pivot joint 22. An end-effector 26 is coupled to the working arm 20 at an angle opposite to the joint 22 by a pivot joint 28 having a coupling mechanism 30. The robot 12 is intended to represent any suitable positioning device for the end-effector 26. The end-effector 26 operates as a print-head assembly for depositing molten filaments for building a complex composite structure as described herein. Various end-effectors can be employed that operate in certain manners and have certain features, and that can be attached to the robot 12. It is noted that during operation, the machine 10 may or may not be positioned within an oven (not shown) so that the temperature of the printing process is controlled.

The end-effector 26 includes an outer housing 34 and a rotatable connector 36 that is releasably connected to the coupling mechanism 30, and is shown as being transparent to illustrate the various components therein. Those components include a number of spools 40 on which a plurality of feedstock filaments 42 of various materials are wound, a drive mechanism 44 for selectively and independently drawing the filaments 42 off of the spools 40, a material extruder 48 through which the filaments 42 are drawn by the drive mechanism 44, a heater 46 for heating the extruder 48 and melting the filaments 42, and a nozzle 50 for extruding the molten filaments 42 out of the end-effector 26 to be deposited on a build plate 52 mounted on a platform 54. A part 56 is shown being fabricated by the machine 10 as it is being built up in a layer-by-layer manner on a support structure 58 formed on the build plate 52. The spools 40 can be mounted in the end-effector 26, or mounted remotely with the material being fed to the end-effector 26 through a tube (not shown). Alternately, the stock material can be provided by pellets instead of using the filament 42.

Figure 2:
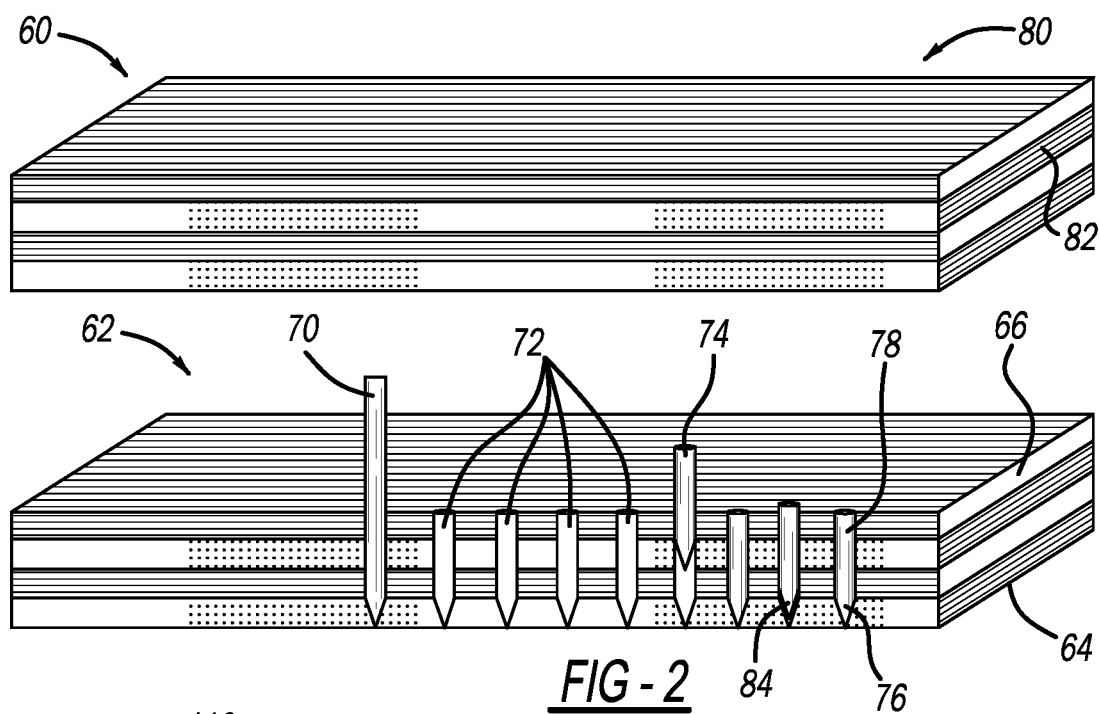
FIG. 2 is an illustration of a thermoplastic composite layered part being fabricated by an additive manufacturing process and being reinforced by Z-pins.

FIG. 2 is an illustration of a structure 60 that is in the process of being fabricated by an additive manufacturing process, for example, by the machine 10. The structure 60 includes a lower laminate section 62 having four layers 64 that have been formed by laying down side-by-side rows of square filaments on a preceding layer in the manner discussed above, where lines in the layers 64 show the direction of fibers 66 in the filaments and the direction that the filaments are laid down, and where the layers 64 may have a thickness of 1/10,000 of an inch. As is apparent, the filaments are laid down 90° relative to each other from one layer 64 to a next layer 64 by rotating the build plate 52 90° each time a layer 64 is completed. The filaments are made of a thermoplastic composite, for example, carbon fibers formed in a thermoplastic matrix or resin.

As discussed above, structures of this type built by an additive manufacturing process may separate between the layers 64, thus reducing the interlaminar integrity of the structure 60 in the Z-direction. In order to reinforce the structure 60, Z-pins are provided in a Z-direction through the layers 64. To accomplish this in one embodiment, a needle 70 is inserted through the layers 64 to form holes 72 in the layers 64 and then rods 74 (Z-pins) are inserted into the holes 72, where the rods 74 have a pointed end 76 and a flat head end 78. The needle 70 can form the holes 72 in any suitable manner. For example, the needle 70 can be ultrasonically vibrated to provide heat and insertion energy into the layers 64, where the composite material of the layers 64 will likely be soft and pliable after just being formed. Alternately, the needle 70 can be heated by a suitable heat source to allow it to be inserted into the layers 64. In one non-limiting embodiment, the rods 74 are carbon fiber pultruded rods. The rods 74 can be shorter than the thickness of the section 62, the same length as the thickness of the section 62, longer than the thickness of the section 62 so that the flat end 78 sticks up from the section 62 or any combination of these lengths. The spacing between the rods 74 and the size of the rods 74 can be application specific for the particular structure 60 being fabricated. Additionally, the rods 74 can be placed at certain areas in the section 62 and not in other areas where reinforcement may not be needed. More specifically, the areal density of the rods 74 can be tailored for a specific application where a higher density of the rods 74 can be at one location and a lower density of the rods 74 can be at another location. For example, the areal density of the rods 74 can be 4% at one location and transition to 0% over a specified area or length of the structure 60. Further, although the rods 74 are cylindrical in this embodiment, they can be Z-pins of different shapes and configurations in other embodiments.

The method described above includes the steps of making the holes 72 and then inserting the rods 74. In an alternate embodiment, the rods 74 may be made of a sufficient material and be of a sufficient robustness where they can be driven into the layers 64 using, for example, ultrasonic energy without requiring the holes 72 to have already been made. Further, instead of using a needle to form the holes 72, a suitable solvent can be used to form openings for the rods 74.

Once the rods 74 have been inserted into the layers 64, the structure 60 can continue to be fabricated. That is illustrated by an upper section 80 having layers 82 formed in the same manner as the section 62, which would be formed on the section 62 in a layer-by-layer manner as described. The layers 82 can be of the same material as the layers 64 or can be of a different material depending on the particular application and design. Once the section 80 has been formed it too can receive rods in the same manner as the section 62 so that it is also reinforced in the Z-direction. If the ends of the rods 74 are sticking up from the section 62, such as shown by rod 84, then the filaments that form the layers 82 can be directed around the rods 74. The location of the rods 74 in the section 80 can be offset from the location of the rods 74 in the section 62 so that they are not aligned with each other. The number of layers that are formed before the rods 74 are inserted would depend on a number of factors, such as the thickness of the layers, the layer material, etc.

Figure 3:
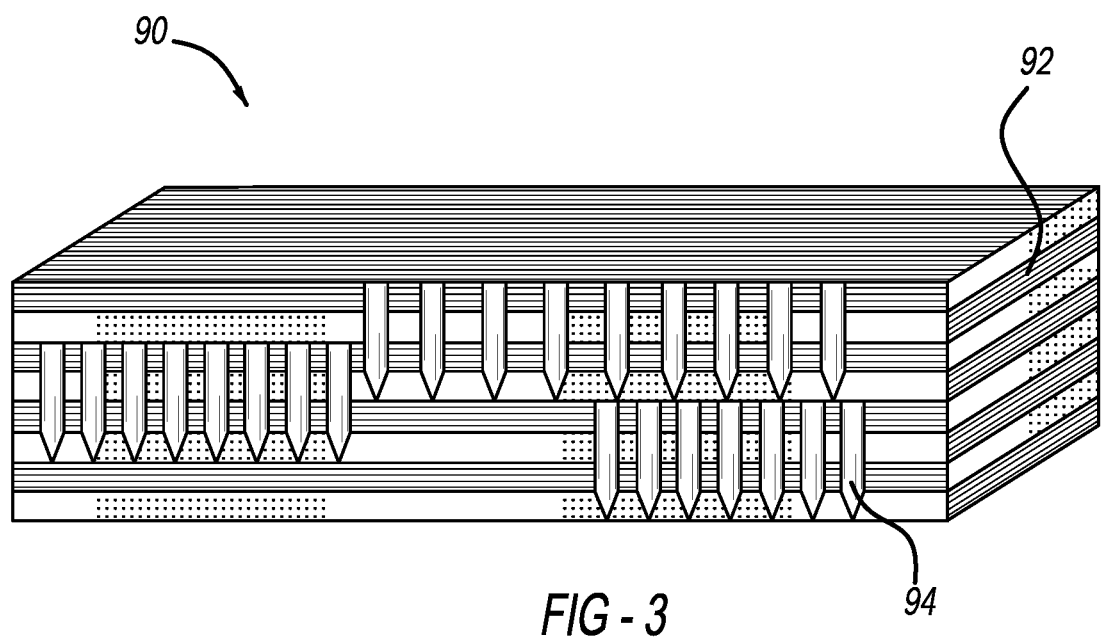
FIG. 3 is an illustration of another thermoplastic composite layered part being fabricated by an additive manufacturing process and being reinforced by Z-pins.

FIG. 3 is an illustration of a thermoplastic composite structure 90 that has been manufactured by an additive manufacturing process including layers 92 that have been formed by laying down side-by-side rows of square filaments on a preceding layer in the manner discussed above showing how the layers 92 can be stitched together by rods 94 in a certain reinforcement configuration.

Figure 4:
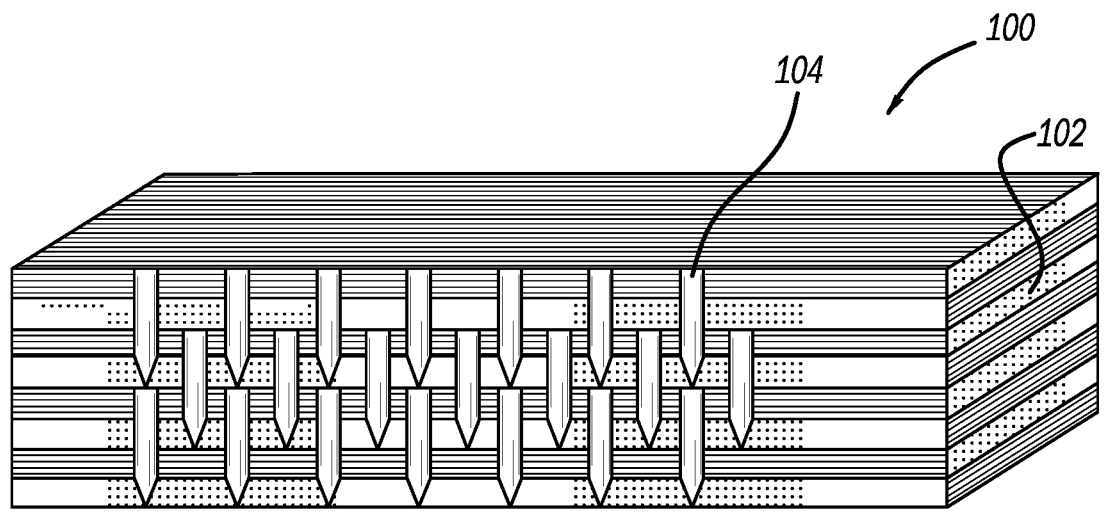
FIG. 4 is an illustration of another thermoplastic composite layered part being fabricated by an additive manufacturing process and being reinforced by Z-pins.

FIG. 4 is an illustration of a thermoplastic composite structure 100 that has been manufactured by an additive manufacturing process including layers 102 that have been formed by laying down side-by-side rows of square filaments on a preceding layer in the manner discussed above showing how the layers 102 can be stitched together by rods 104 in another reinforcement configuration.

Figure 5:
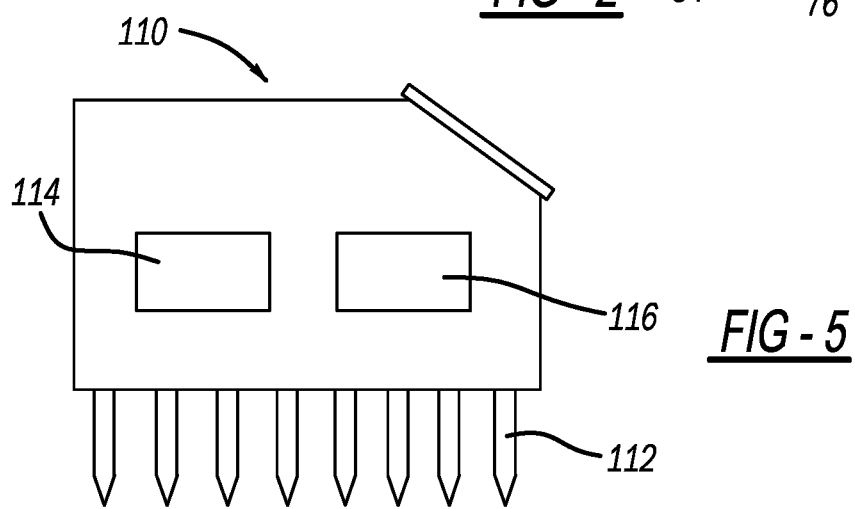
FIG. 5 is an illustration of an end-effector for the robot shown in FIG. 1 for providing holes in the part that accept the Z-pins.

In a practical implementation, multiple needles 70 can be used to form multiple holes 72 at the same time. FIG. 5 is a front view of an end-effector 110 that can replace the end-effector 26 and be coupled to the coupling mechanism 30 on the machine 10 so that the machine 10 can form the holes 72. The end-effector 110 includes a plurality of needles 112 that can be used to simultaneously form a plurality of the holes 72 in the layers 64. An ultrasound or heat source 114 vibrates and/or heats the needles 112 and a device 116 applies downward pressure on the needles 112 to form the holes 72.

Figure 6:
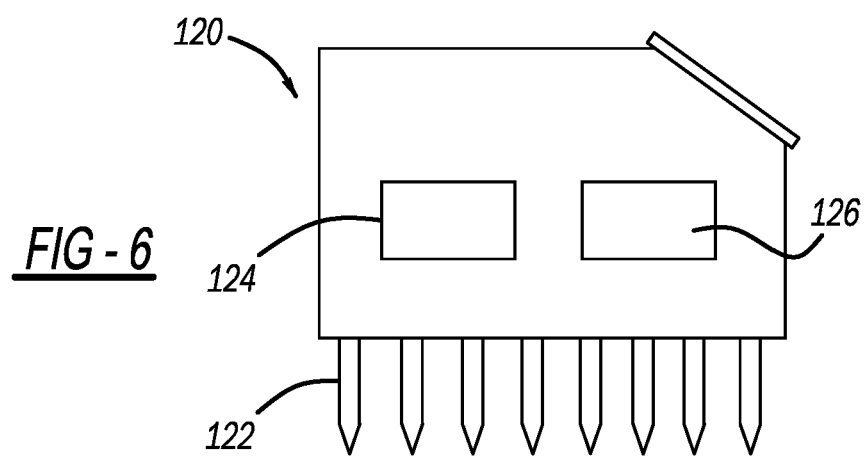
FIG. 6 is an illustration of an end-effector for the robot shown in FIG. 1 for inserting the Z-pins in the holes.

FIG. 6 is a front view of an end-effector 120 that can replace the end-effector 26 and be coupled to the coupling mechanism 30 on the machine 10 so that the machine 10 can insert the rods 74 into the holes 72. The end-effector 100 includes a plurality of rods 122 that are simultaneously inserted into the plurality of the holes 72 in the layers 64 and released by a release mechanism 124. For certain applications, an ultrasonic source 126 can be employed to vibrate the rods 122 and drive them into the layers 64 without the need to provide the holes 72.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. An automated method for fabricating a composite part, said method comprising:
   depositing a plurality of part layers in a consecutive manner on top of each other in the X and Y directions where each layer is deposited by laying down rows of filaments made of a thermoplastic composite material;
   inserting reinforcing Z-pins through the part layers to provide reinforcement of the part in the Z-direction; and depositing a plurality of additional part layers in a consecutive manner on top of each other where each additional layer is deposited by laying down rows of the filaments made of the thermoplastic composite material on the part layers including the reinforcing Z-pins and inserting the reinforcing Z-pins through the additional part layers to provide reinforcement of the part in the Z-direction.

2. The method according to claim 1 wherein at least some of the reinforcing Z-pins in the part layers and the additional part layers are off-set from each other and are not aligned.

3. The method according to claim 1 wherein inserting the reinforcing Z-pins includes inserting the Z-pins all of the way through the part layers.

4. The method according to claim 1 wherein inserting the reinforcing Z-pins includes inserting the Z-pins part way through the part layers.

5. The method according to claim 1 wherein inserting the reinforcing Z-pins includes inserting the Z-pins so that a back end of the Z-pins stick up from the part layers.

6. The method according to claim 1 wherein inserting the reinforcing Z-pins includes providing a higher density of the Z-pins at one location than at other locations.

7. The method according to claim 6 wherein inserting the reinforcing Z-pins includes transitioning the areal density of the Z-pins from the higher density location to a lower density location.

8. The method according to claim 1 wherein inserting the reinforcing Z-pins through the part layers includes ultrasonically vibrating the Z-pins and forcing them into the part layers.

9. The method according to claim 1 wherein inserting the reinforcing Z-pins through the part layers includes forming a plurality of holes through the part layers and then inserting the reinforcing Z-pins in the holes.

10. The method according to claim 9 wherein forming the plurality of holes includes using at least one needle.

11. The method according to claim 10 wherein forming the plurality of holes includes ultrasonically vibrating the at least one needle.

12. The method according to claim 10 wherein forming the plurality of holes includes heating the at least one needle.

13. The method according to claim 10 wherein forming the plurality of holes includes inserting a plurality of needles at the same time into the part layers.

14. The method according to claim 9 wherein forming the plurality of holes includes using at a solvent.

15. The method according to claim 1 wherein the Z-pins are rods.

16. The method according to claim 15 wherein the rods are carbon fiber pultruded rods.

17. The method according to claim 1 wherein the thermoplastic composite material is carbon fiber in a thermoplastic matrix.

18. A method for fabricating a composite part, said method comprising:

depositing a plurality of part layers in a consecutive manner on top of each other in the X and Y directions where each layer is deposited by laying down rows of filaments made of a thermoplastic composite material;

inserting reinforcing rods through the part layers to provide reinforcement of the part in the Z-direction so that at least some of the reinforcing rods stick up from the part layers;

depositing a plurality of additional part layers in a consecutive manner on top of each other in the X and Y directions where each additional layer is deposited by laying down rows of the filaments made of the thermoplastic composite material on the part layers including the reinforcing rods; and inserting the reinforcing rods through the additional part layers to provide reinforcement of the part in the Z-direction.

19. The method according to claim 18 wherein inserting the reinforcing rods includes providing a higher density of the rods at one location than at other locations.

* * * * *